United States Patent
Ulbrich-Gasparevic et al.

(10) Patent No.: US 9,376,047 B2
(45) Date of Patent: Jun. 28, 2016

(54) TRAY ARRANGEMENT FOR A VEHICLE, PASSENGER SEAT AND AIRCRAFT

(71) Applicant: Airbus Operations GmbH, Hamburg (DE)

(72) Inventors: Jovan Ulbrich-Gasparevic, Pinneberg (DE); Michael Mosler, Plaisance du Touch (FR)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/140,891

(22) Filed: Dec. 26, 2013

(65) Prior Publication Data

US 2014/0183910 A1   Jul. 3, 2014

Related U.S. Application Data

(60) Provisional application No. 61/746,593, filed on Dec. 28, 2012.

(30) Foreign Application Priority Data

Dec. 28, 2012  (DE) .................. 20 2012 105 089 U

(51) Int. Cl.
*A47B 39/00* (2006.01)
*B60N 3/00* (2006.01)
*B64D 11/06* (2006.01)

(52) U.S. Cl.
CPC *B60N 3/002* (2013.01); *B60N 3/00* (2013.01); *B60N 3/004* (2013.01); *B64D 11/06* (2013.01); *B64D 11/0624* (2014.12); *B64D 11/0638* (2014.12); *Y02T 50/46* (2013.01)

(58) Field of Classification Search
CPC ........ B60N 3/004; B60N 3/001; B60N 3/002; B64D 11/00151; B64D 11/00152; B64D 11/0015
USPC ........ 108/44, 42, 13; 297/146, 147, 145, 148, 297/160
See application file for complete search history.

(56) References Cited

U.S. PATENT DOCUMENTS 2,619,395 A * 11/1952 Kent .............................. 297/146
3,605,650 A *  9/1971 Hebel et al. ..................... 108/13
(Continued)

FOREIGN PATENT DOCUMENTS

DE          9409709 U1    9/1994
DE    102004047609 A1    5/2005
(Continued)

OTHER PUBLICATIONS

German Patent and Trade Mark Office, German Search Report for German Patent Application No. 202012105089.7, mailed Dec. 6, 2013.

*Primary Examiner* — Jose V Chen
(74) *Attorney, Agent, or Firm* — Ingrassia Fisher & Lorenz, P.C

(57) ABSTRACT

A tray arrangement is provided. The tray arrangement includes a tray element with a first side and a second side. The tray arrangement also includes a bearing arrangement for the tray element. The tray element is supported on the bearing arrangement and the second side comprises a holding arrangement for a mobile device. The bearing arrangement is configured to pivot the tray element about at least an axis which lies in a plane of the tray element or parallel thereto.

17 Claims, 6 Drawing Sheets

(56) References Cited

U.S. PATENT DOCUMENTS

| | | | |
|---|---|---|---|
| 3,667,803 A * | 6/1972 | Ford | 297/119 |
| 4,511,178 A * | 4/1985 | Brennan | 297/146 |
| 4,668,010 A * | 5/1987 | Fujiwara | 297/150 |
| 5,092,652 A * | 3/1992 | Macaluso | 108/26 |
| 5,984,347 A * | 11/1999 | Blanc-Rosset | 297/146 |
| 6,113,182 A * | 9/2000 | Wise | 108/13 |
| 6,454,349 B1 * | 9/2002 | Konya | 297/146 |
| 6,601,523 B2 * | 8/2003 | Jensen | 108/44 |
| 6,719,343 B2 | 4/2004 | Emerling et al. | |
| 6,758,518 B2 * | 7/2004 | Ingram et al. | 108/44 |
| 6,761,398 B2 * | 7/2004 | Bentley et al. | 297/146 |
| 6,926,278 B2 * | 8/2005 | Bibi | 273/284 |
| 7,004,430 B2 * | 2/2006 | Weekly | 297/146 |
| 7,500,716 B2 * | 3/2009 | Guerin et al. | 297/146 |
| 7,611,198 B2 | 11/2009 | Schweizer | |
| 7,621,593 B2 * | 11/2009 | Dickinson | 297/146 |
| 7,793,597 B2 * | 9/2010 | Bart et al. | 108/44 |
| 7,971,929 B2 * | 7/2011 | Kennard et al. | 297/146 |
| 2005/0150433 A1 * | 7/2005 | Lo | 108/50.01 |
| 2007/0283855 A1 * | 12/2007 | Pozzi | 108/44 |
| 2009/0307843 A1 * | 12/2009 | Hookway et al. | 108/25 |
| 2010/0052486 A1 * | 3/2010 | Hemmer | 108/50.01 |
| 2010/0224102 A1 * | 9/2010 | Allgood | 108/44 |

FOREIGN PATENT DOCUMENTS

| | | |
|---|---|---|
| DE | 102004033897 A1 | 2/2006 |
| DE | 202008017856 U1 | 10/2010 |
| DE | 102010004369 A1 | 7/2011 |
| DE | 202012100251 U1 | 2/2012 |
| DE | 102012208909 A1 | 11/2012 |
| WO | WO/01/58721 A1 | 8/2001 |

* cited by examiner

TRAY ARRANGEMENT FOR A VEHICLE, PASSENGER SEAT AND AIRCRAFT

CROSS-REFERENCE TO RELATED APPLICATIONS

This application claims priority to German Patent Application No. 20 2012 105 089.7, filed Dec. 28, 2012, and to U.S. Provisional Patent Application No. 61/746,593, filed Dec. 28, 2012, which are each incorporated herein by reference in their entirety.

TECHNICAL FIELD

The technical field relates to a tray arrangement for a vehicle, a vehicle cabin with at least one seat and at least one tray arrangement associated with this seat as well as an aircraft with a cabin, at least one seat and at least one tray arrangement associated with this seat.

BACKGROUND

In vehicles which serve for transporting passengers, tray elements which can be moved out of a retained position into a position for use are frequently associated with passenger seats. In the retained position the tray element is stowed so that it does not restrict the space or the sensation of space on the passenger seat for the passenger. When required, the tray element can be moved into a position for use so that it takes up a substantially horizontal position and allows personal objects or food on trays to be placed on it. It is known to use tray elements in the form of folding tables which are in one piece or segmented and can be folded onto a seat back of a passenger seat disposed in front of the passenger seat under an armrest of the passenger seat.

In passenger aircraft, for entertainment passengers are routinely provided with screens for the display of visual content and at least one audio connection for headphones. In this case the screens are usually integrated in the seat back of the passenger seat in front, alternatively also on a partition, a pivot arm or other installations disposed in the vicinity. The functions of the screen and of the audio connection are fixed during the production or the modernization of the vehicle and then perform practically unchangeable functions for a relatively long period of time until they are replaced. Regardless of this, passengers on longer journeys bring with them mobile devices which can also be used for entertainment. Mention may be made for example to smart phones and tablet PCs, which are currently undergoing a rapid technological advance. Whilst using these mobile devices the passenger holds them in his hand or puts them down on a previously mentioned tray element.

In addition, other objects, desirable features and characteristics will become apparent from the subsequent summary and detailed description, and the appended claims, taken in conjunction with the accompanying drawings and this background.

SUMMARY

Holding or putting down a personal mobile device used for entertainment at a passenger seat is uncomfortable and in the latter case, because of vibrations or other vehicle movements, can also lead to the mobile device periodically falling off awkwardly or completely from a tray surface. Accordingly, the present disclosure provides, in the context of the usually limited space available on a passenger seat in a vehicle, a system which makes it easier for a passenger to use mobile electronic devices for entertainment.

A tray arrangement having a tray element with a first side and a second side is proposed, which also comprises a bearing arrangement for bearing the tray element, wherein the tray element is pivotably arranged on the bearing arrangement, wherein the second side has a holding arrangement for a mobile device, wherein the bearing arrangement is configured to pivot the tray element about at least one axis which lies in a plane of the tray element or parallel thereto.

The tray element may for example be associated with a passenger seat in a cabin of a vehicle, so that a passenger can put objects down on it. The tray function is implemented by the first side of the tray element, which is provided for this original purpose. In one example, for the setting down of food and beverages, the first side may have corresponding recesses which prevent slipping of a tablet or a container and accordingly can be designed in accordance with conventional criteria. The special feature of the tray arrangement lies in the holding arrangement for a mobile device on the second side of the tray element. This arrangement is capable of holding a mobile device firmly so that during use in a vehicle it always remains in place and the user of the mobile device does not have to be constantly concerned with holding the mobile device.

The particular advantage of the tray arrangement is that this is very similar to a common tray table arrangement, but by modification with the aid of the holding arrangement and a suitable bearing arrangement for the tray element said tray element may perform the additional function of holding mobile devices. To switch between the functions of setting down objects and holding mobile devices, the at least one tray element can be rotated or pivoted about an axis lying parallel to or on the plane of the at least one first tray element. This means that the tray arrangement for example enables the pivoting of the at least one first tray element in order to change the orientation of the first side and the second side.

Since in any case a user can hardly use the tray element for placing his mobile device if for example food is already placed on it, it is not necessary to create a separate tray element for this purpose. Accordingly the combination of these two functions in one single unit leads to a significantly increased convenience and at the same time a significantly reduced weight.

In one embodiment the holding arrangement has a recess disposed on the second side of the tray element to receive a mobile device. The recess can have a shape which enables a mobile device to be accommodated completely. This includes a suitable depth and a corresponding external geometry which may assist the function of the holding arrangement. Furthermore, by adaptation of its dimensions and by introduction of at least one undercut or releasable fastening means the shape is designed so that a positively engaged connection to the mobile device is produced, so that the mobile device cannot fall out from the holding arrangement. A positively engaged connection may be assisted for instance by a snap, detent, lever or locking mechanism. Such a mechanism may be located for instance on the edge of the recess and may allow the insertion of a mobile device but prevent it from being removed or falling out. In order nevertheless to remove the mobile device again from the holding arrangement, it may be appropriate to design the holding arrangement to be releasable and by release of the snap, detent, lever or locking mechanism to allow release of the mobile device as required.

In one exemplary embodiment a projection is disposed on at least one edge of the recess, whilst a connecting element is disposed on the opposing side of the recess. The mobile device may be placed into the recess configured in this way, so that on at least one edge the recess and the at least one projection engage around it like pincers. On the opposing side the connecting element may then have a positively or non-positively engaged connection to the mobile device, by for example likewise engaging around the mobile device at this point like pincers, gripping it firmly or holding it in a similar manner. The connecting element is generally designed to be releasable and releases the mobile device as required.

In one embodiment an interchangeable frame which comprises the holding arrangement is arranged on the tray element or forms this element. As mentioned in the introduction, the equipment of vehicles is static for a certain time period, i.e. installed components are not replaced for a certain period of use. In the rapidly developing market for mobile devices, such as smart phones and tablet PCs, however, there are always further developments to be observed which also lead to constantly changing housing geometries of the mobile devices. This development may be taken into account by an interchangeable frame which itself accommodates the holding arrangement. Simply interchanging frames with holding arrangements integrated therein also makes it possible, in spite of the static installation, to quickly customise the tray arrangement to predominant types of device.

In one exemplary embodiment the recess comprises a rubberised inner surface. Often sensitive surfaces of mobile devices, for example polished metal surfaces of tablet PCs, may be protected thereby. In one example, in the case of operationally induced vibrations this does not lead to the production of scratches on the rear face of the housing.

In one embodiment the holding arrangement has at least one elongate holding element and two guide means disposed parallel to one another and spaced apart from one another, wherein the holding element is movably mounted in the guide means. If the tray element has a recess, the guide means may be located on two sides adjacent to the recess. In this way different housing sizes of mobile devices can be taken into account as the at least one holding element can be positioned at different positions and can hold a mobile device located in the depression. It will be understood that the guide means are set up in such a way that once a position has been adopted by the at least one holding element in the guide means this position can be secured. If the tray element has a recess, this may have on one edge a projection which leads to one edge of the mobile device being gripped in a pincer-like manner. On an opposing side of a mobile device located in this way below the projection, at least one movable holding element may be provided. As an alternative, it is also possible to use a second holding element which may likewise be freely positioned on the guide means and the said projection may be omitted. Thus a recess disposed in the tray element may have somewhat larger dimensions than are necessary for current mobile devices, so that there is a degree of certainty that future devices may also be held here.

In one exemplary embodiment the tray element comprises a cutout which is suitable for the arrangement or passage of a power supply cable with a connector. From the at least one tray element a cable may be guided into the cutout, wherein the cutout should be placed where the most common devices have their power connection. Furthermore the connector may be adapted to currently common mobile devices, for instance by the use of a universal connector which may be quickly adapted to different mobile devices by appropriate attachments or adapters.

In one embodiment a transmission device is disposed on the at least one first tray element to connect the power supply cable to an external power supply. The transmission device may be both mechanical and inductive, the mechanical design being based for example on a commutator principle in order to take account of the pivoting movement of the tray element. The inductive variant may contain two coils which may be brought into alignment, wherein one coil is disposed in the region of the at least one first tray element and the second coil is disposed on the bearing arrangement. The first coil may be connected to the power cable located in the cutout, whilst the second coil may be connected to a power supply on board the vehicle.

In one exemplary embodiment an induction coil is disposed on the tray element which is connectable to a power supply and an electronic charger. More modern mobile devices sometimes already have induction coils for performing a wireless power transmission for charging a battery. Accordingly a mobile device may be placed in the holding arrangement so that an automatic alignment takes place between the induction coil and an induction coil in the mobile device. Thus the use of a wired power supply for charging the mobile device is not absolutely necessary.

In advantageous manner the bearing arrangement may permanently be connected to the tray element and may be supported so as to be pivotable about a first axis. The orientation of the tray arrangement in a folded-down tray position and a neutral position may be changed quickly. The connection may take place by positive engagement, for instance by insertion and latching of the tray element in the bearing arrangement or by locking of an articulation or guiding arrangement. The bearing arrangement may be supported on an equipment component inside the vehicle.

Furthermore it is advantageous if the bearing arrangement is set up to hold the tray element in at least two orientations about a second axis relative to the bearing arrangement. Thus it is possible for the user of the mobile device to change the orientation of the tray element in a folded-down position of the tray arrangement, so that an improved interaction is achieved.

In one embodiment, for this purpose the bearing arrangement comprises for instance two rail supports which extend parallel to one another and spaced apart from one another and two pivot joints, wherein the pivot joints are each movably guided in a rail support and wherein the tray element is connected to the pivot joints so as to be pivotable about the second axis. This means that the tray element is movably connected in each case by means of a pivot joint to a respective rail support, so that in for example an end position the tray element is rotatable about 180° or a different angle. Each pivot joint in one example, has a detent mechanism which holds the at least one first tray element securely in at least one intended end position and can only be released from this position and moved into another position by a certain exertion of force or a releasable locking means. For example the pivot joint may be arranged in such a way that the at least one first tray element may be oriented with the first side parallel to the rail supports and in a different position with the second side parallel to the rail supports, but on an upper face of the arrangement. An intermediate position in which the first side is slightly or considerably inclined with respect to the rail supports may be advantageous. In this way the user could choose an optimal angle for him to view his mobile device. Of course, when the tray arrangement is positioned on a seat back of a passenger seat by folding up the tray element onto the seat back viewing of the mobile device is already possible.

Such rail supports may correspond to the customary mounting of folding tables which are disposed on the seat back of passenger seats. These are generally pivotably mounted and arranged to hold a folding table in a horizontal position or in flush contact with a seat back.

As stated above it is advantageous if the pivot joints can be locked. For this purpose the pivot joints themselves may be equipped so that a locking force counteracts a pivoting movement. This locking may be released by means of an operating element disposed in the region of the pivot joint. As an alternative the tray arrangement may also be designed so that the tray element must be moved along the rail support in a direction for instance directed away from the seat back of the passenger seat, in order to provide free pivotability of the tray element about the bearing arrangement. For this purpose, in the region of the pivot joints or the outer edges the bearing arrangement or the tray element may have a recess or a groove which may participate in a positively engaged connection to a correspondingly disposed pin or a spring if the tray element is not displaced relative to the bearing arrangement. This positively engaged connection should be dimensioned so that it is released when the tray element is moved, so that the pivoting movement can take place.

It will be understood that the tray element may also be of multi-part design and any recesses may also extend over several segments of the tray element. Multi-part tray elements are generally designed to be foldable, so that they can be stowed for instance in armrests. If elongate holding elements are used for a holding arrangement, these may likewise be of multi-part, flexible, foldable design.

The various teachings of the present disclosure further relates to a passenger seat for a vehicle, having at least one tray arrangement according to the present disclosure.

Furthermore the present disclosure relates to an aircraft with a passenger cabin in which passenger seats are disposed which each have a tray arrangement according to the various teachings of the present disclosure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
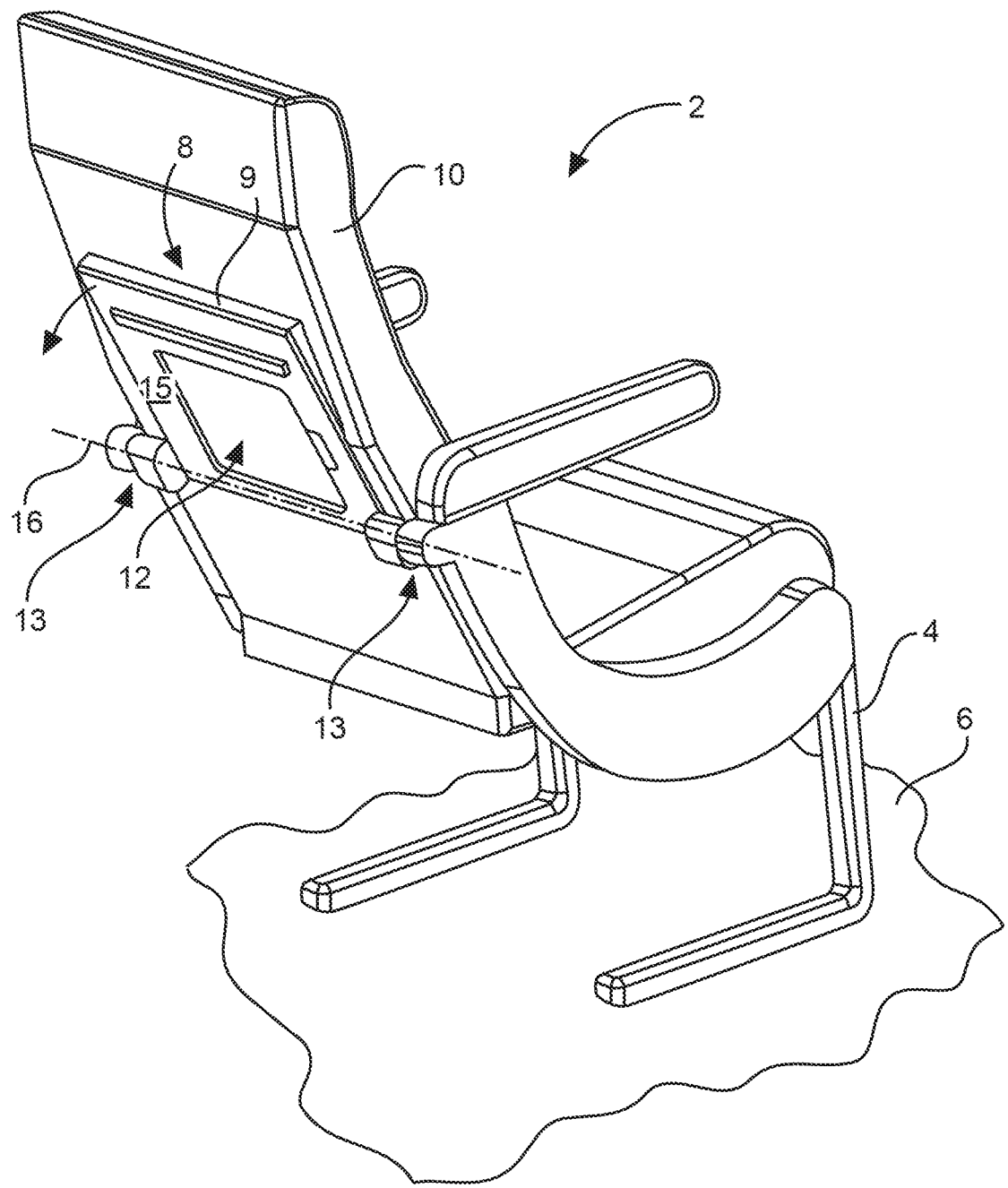
FIG. 1 shows a passenger seat with a tray arrangement in a folded-up position.

FIG. 1 shows a passenger seat 2 which is fastenable with the aid of a frame 4 on a floor 6 in a cabin of a vehicle and comprises a tray arrangement 8 with a tray element 9 which is disposed on the seat back 10 so as to be pivotable about an axis of rotation 16 which extends for example substantially parallel to the extension plane of the tray element 9 and lies for example on an edge of the tray element 9 facing the seat back 10. In the illustration in FIG. 1 the tray arrangement 8 is folded up onto the seat back 10, so that a holding arrangement 12 located on a side of the tray element 9 referred to hereafter as the "second side 15" is visible on the side facing away from the seat back 10. This position is also referred to hereafter as the "neutral position". In this case hinges 13 form a bearing arrangement for bearing the tray element 9.

The holding arrangement 12 is designed to hold a mobile device, for example a tablet PC, securely in the tray arrangement 8 and thus on the passenger seat 2. Thus for a passenger located behind the passenger seat 2 it is possible to use a mobile device for entertainment during his stay on board the relevant vehicle without having to hold the device in his hand all the time. Details of the holding arrangement 12 are set out below.

Figure 2:
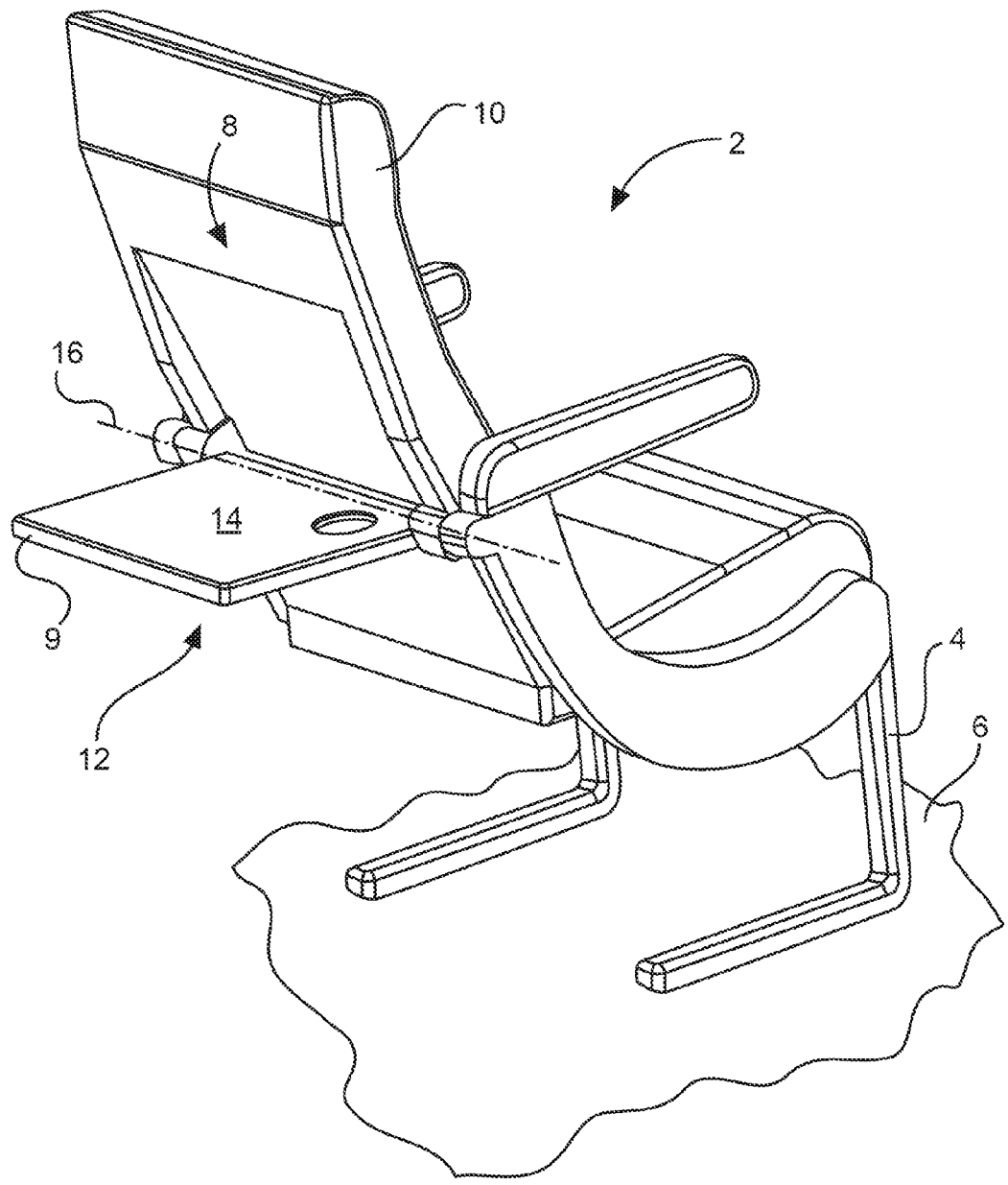
FIG. 2 shows a passenger seat with a tray arrangement disposed thereon in a folded-down tray position.

FIG. 2 shows the same passenger seat 2 with the tray element 9 folded down. This position is also referred to below as the "folded-down tray position". In the folded-down tray position a first side 14 of the tray element 9 is oriented substantially horizontally relative to the floor 6 and consequently serves as a tray surface in one example, for food. Accordingly with the tray element 9 in the folded-down tray position the user may use it as a conventional folding tray table, in order to place food on it. The pivoting of the tray element 9 from the neutral position into a folded-down tray position takes place by pivoting about the axis of rotation 16.

Figure 3:
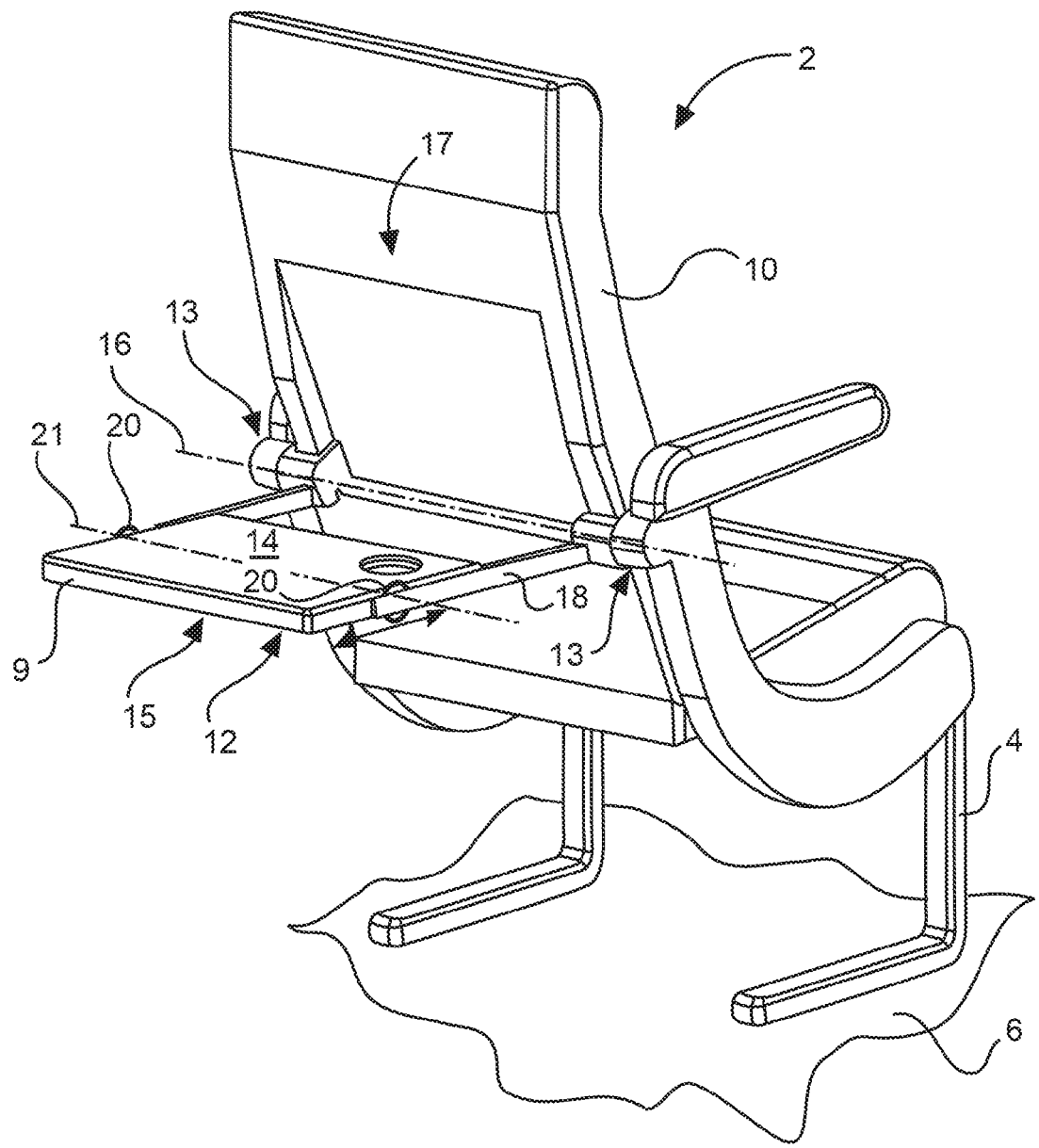
FIG. 3 shows a passenger seat with a tray arrangement in a further folded-down position.

As FIG. 3 demonstrates, in a modified tray arrangement 17 the tray element 9 is movable linearly to adjust a spacing from the seat back 10 along an elongate rail support 18. Furthermore the tray element 9 may be disposed on the rail support 18 by means of pivot joints 20 which allow pivoting of the tray element 9 about an additional axis of rotation 21 which by way of example extends in the plane spanned by the tray element 9. Accordingly, the bearing arrangement may have the rail support 18 and the pivot joints 20 and also the hinges 13.

Therefore by turning of the tray element 9 either the first side 14 or the second side 15 of the tray element 9 can be directed upwards, i.e. onto a side directed away from the floor 6. Accordingly, the tray element 9 can either function as a tray or can make the mobile device visible and usable. Also it may be pointed out that, when performing the tray table function the holding arrangement 12 can also hold the mobile device, this device is not visible for the user on account of its arrangement on the second side. However, in the folded-down tray position said device is securely supported and is protectable against soiling in particular during consumption of food on the tray element 9.

Figure 4:
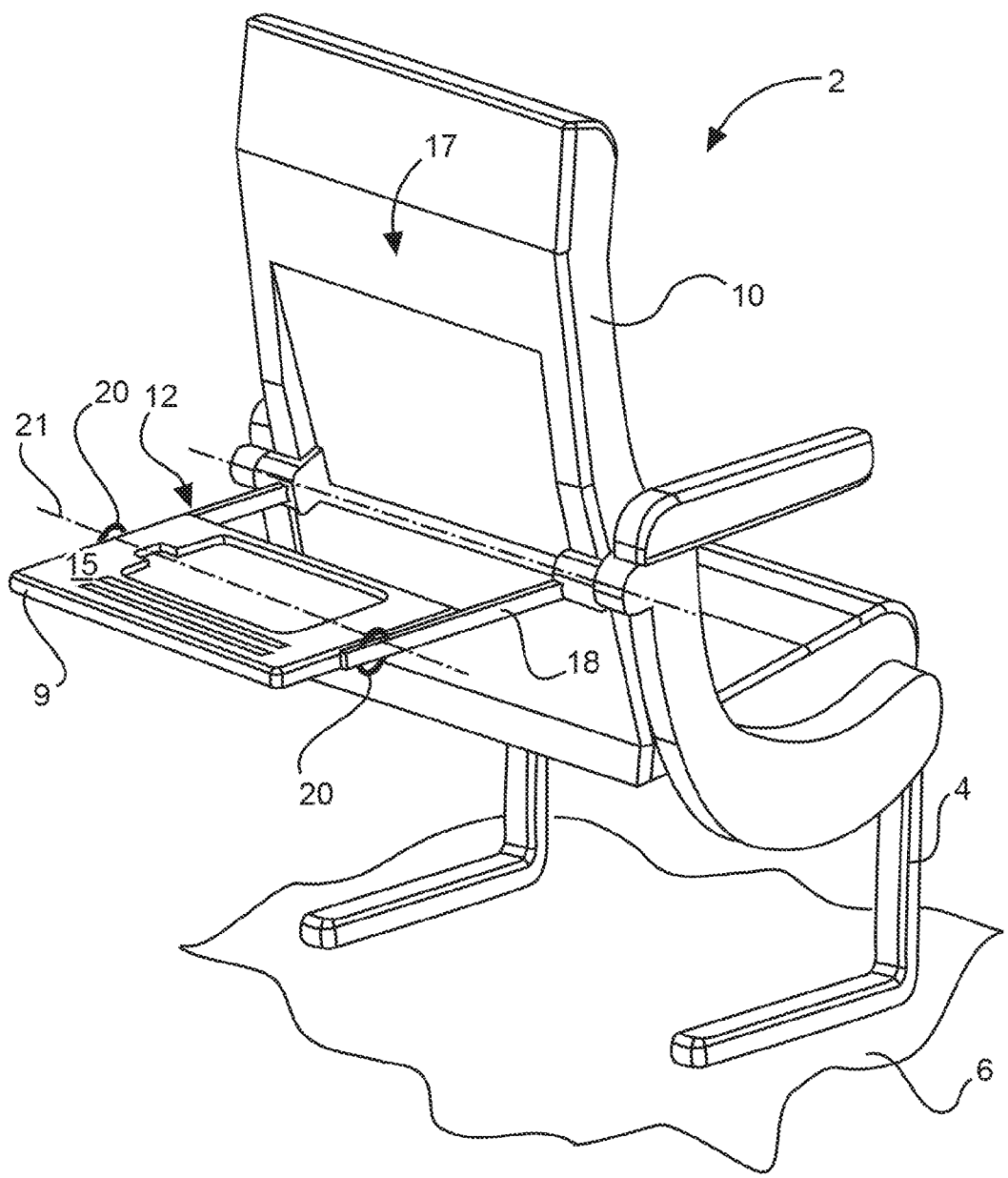
FIG. 4 shows a passenger seat with a tray arrangement in a holding position.

In the illustration of FIG. 4 the second side 15 with the holding arrangement 12 is directed upwards and may hold the mobile device ready for use in this position. This is recommended for example when an interaction with a tablet PC or another device with input means is necessary. In this case the operation does not necessitate the constant lifting of an arm in order to touch a touch screen in a neutral position. If following interaction the tray element 9 is folded up to the seat back 10, the mobile device can be used in particular for viewing videos, since a more ergonomic view for the user is possible there.

Figure 5A:
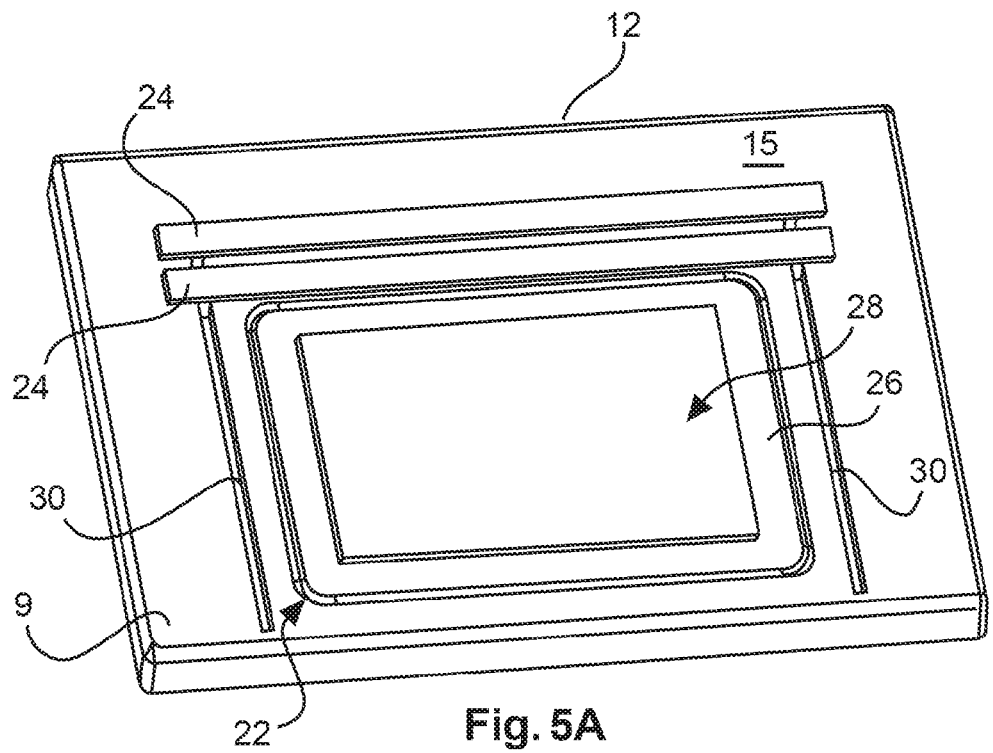
FIGS. 5A-5B show respectively a passenger seat with a tray arrangement and a tray arrangement with a holding arrangement and a mobile device held therein.
Figure 5B:
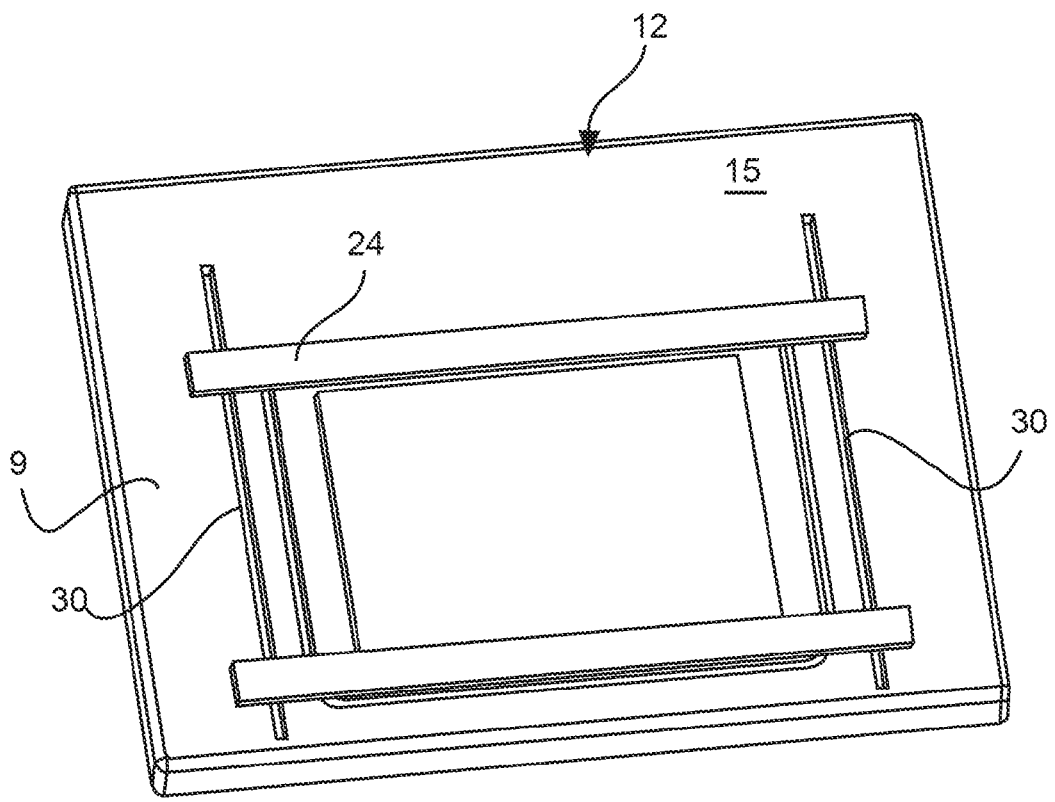

The holding arrangement 12 for holding the mobile device can be implemented by arrangement of two elongate holding bodies 24 which are shown for example in FIG. 5A and which are placeable over a frame 26 of a mobile device 28 which is located in a recess 22. In FIG. 5B it is also clear that a recess 22 to receive the mobile device 28 on is surrounded on both sides by guide means 30 in which the holding bodies 24 are movably mounted. The holding bodies 24 may generally be fixed in their assumed position, for example by a corresponding frictional grip in the guide means 30, wherein a portion of the holding body 24 which protrudes into the guide means 30 may have an undercut or a shoulder to prevent automatic loosening. Secure holding of mobile terminals of practically any size can be achieved by the use of illustrated holding bodies 24.

Figure 6A:
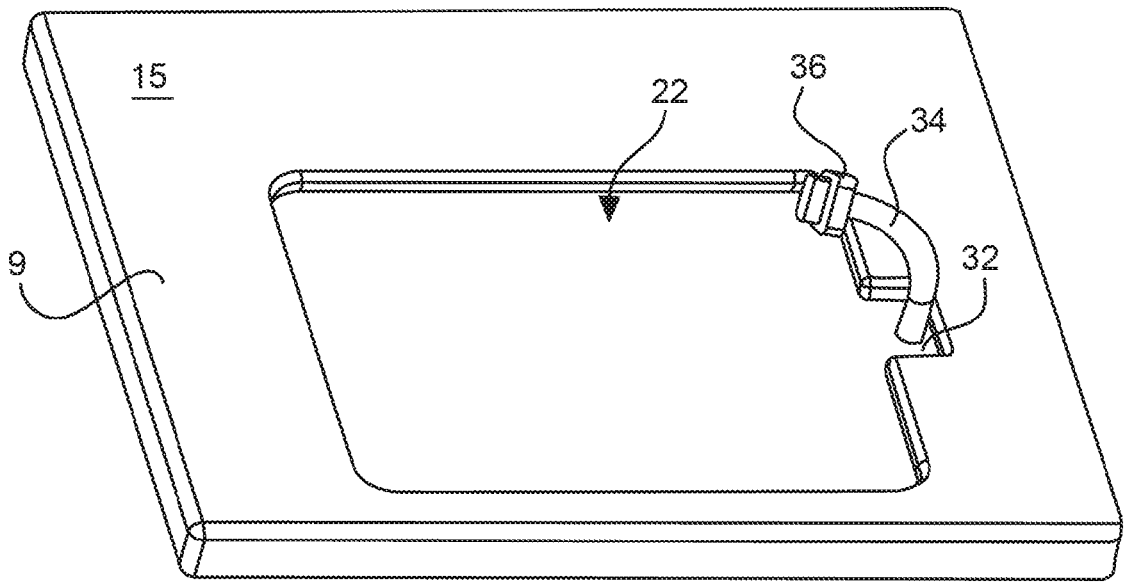
FIGS. 6A and 6B show a detail of a tray arrangement with a power supply cable and a mobile device disposed therein which is connected to the power supply cable.

Furthermore FIG. 6A shows a tray element 9 which comprises a recess 22 to receive a mobile device, wherein the tray element 9 also comprises a cutout 32 for the passage and/or mounting of a power cable 34 with a connector 36. After introduction of the mobile device this device may be connected with the aid of the connector 36 to an onboard power supply. For example, the pivot joints 20 shown in FIG. 3 have suitable connecting devices for this which ensure a rotatable electrical connection, mechanically or inductively.

Figure 6B:
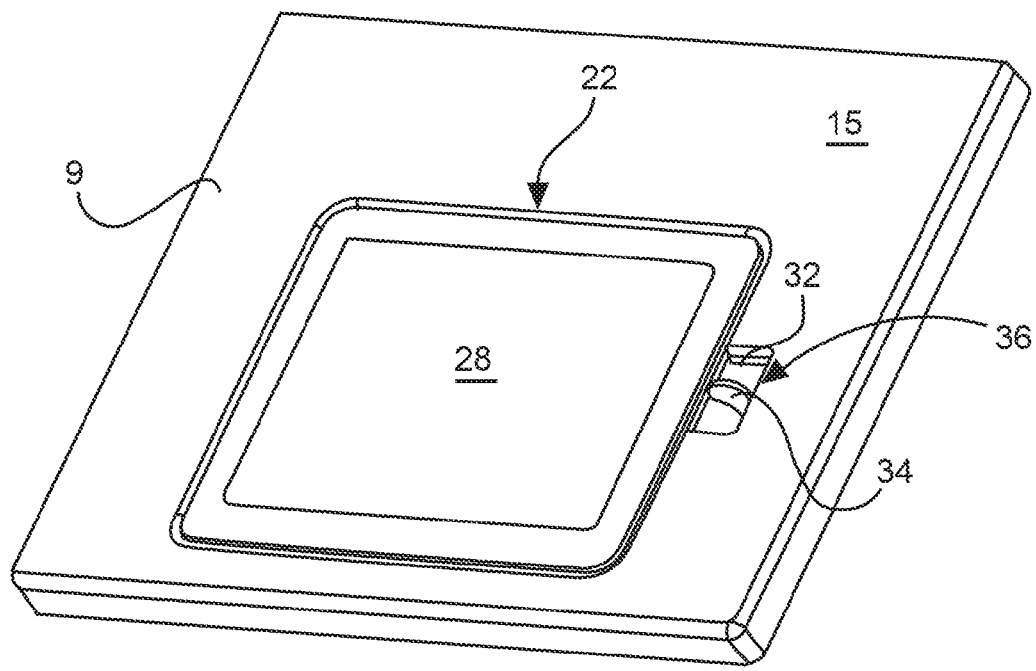

Finally, FIG. 6B shows the mobile device 28 placed into the recess 22 and connected to the power supply cable 34.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A tray arrangement, comprising:
   a tray element having a first side and a second side;
   a bearing arrangement for supporting the tray element; and
   a holding arrangement configured to securely hold a mobile device on the second side and receiving the mobile device therein;
   wherein the bearing arrangement is configured to pivot the tray element about an axis which lies in a plane of or parallel to the tray element;
   wherein the holding arrangement comprises at least one elongate holding element; and
   wherein when the tray is in an upright position, the holding arrangement positions the mobile device to face substantially upward and when the tray is rotated to face substantially downward, the holding arrangement retains the mobile device on the tray.

2. The tray arrangement of claim 1,
   wherein the holding arrangement comprises a recess disposed on the second side of the tray element for receiving the mobile device entirely therein.

3. The tray arrangement of claim 2,
   wherein a projection is disposed on at least one edge of the recess and a connecting element is disposed on the opposing side of the at least one edge of the recess.

4. The tray arrangement of claim 1,
   further comprising an interchangeable frame which is disposed on the tray element.

5. The tray arrangement of claim 4, wherein the interchangeable frame forms the holding arrangement.

6. The tray arrangement of claim 2,
   wherein the recess comprises a rubberised inner face.

7. The tray arrangement of claim 1,
   wherein the holding arrangement comprises two guide devices disposed parallel to one another and spaced apart from one another, and wherein the at least one holding element is movably mounted in the guide devices.

8. The tray arrangement of claim 1,
   wherein the tray element comprises a cutout, which is dimensioned for the arrangement or passage of a power supply cable and an associated connector.

9. The tray arrangement of claim 8,
   further comprising a transmission device on the tray element, which connects the power supply cable to an external power supply.

10. The tray arrangement of claim 1,
    further comprising an induction coil on the tray element, which is connectable to a power supply and an electronic charger.

11. The tray arrangement of claim 1,
    wherein the bearing arrangement is permanently connectable to the tray element and mountable pivotably about a first axis.

12. The tray arrangement of claim 1,
    wherein the bearing arrangement comprises two rail supports, which are spaced apart from one another and extend parallel to one another, and two pivot joints each movably guided in a rail support and the tray element is connected to the pivot joints so as to be pivotable about a second axis.

13. The tray arrangement of claim 12, wherein at least one of the pivot joints is lockable.

14. A passenger seat for a vehicle, comprising:
    a tray arrangement including a tray element with a first side and a second side, the second side having a holding arrangement configured to securely hold a mobile device, and the tray element supported on a bearing arrangement, the bearing arrangement configured to pivot the tray element about at least an axis which lies in a plane of the tray element or parallel thereto,
    wherein the holding arrangement is provided exclusively on the second side of the tray arrangement and comprises (a) a recess disposed on the second side of the tray element to receive the mobile device and (b) at least one elongate holding element; and
    wherein when the tray is in an upright position, the holding arrangement positions the mobile device to face substantially upward and when the tray is rotated to face substantially downward, the holding arrangement retains the mobile device on the tray.

15. An aircraft, comprising:
    a passenger cabin; and
    at least one passenger seat in the passenger cabin, the at least one passenger seat including a tray element with a first side and a second side, the second side having a holding arrangement configured to securely hold a mobile device, and the tray element supported on a bearing arrangement, the bearing arrangement configured to pivot the tray element about at least an axis which lies in a plane of the tray element or parallel thereto, and wherein when the tray is in an upright position, the holding arrangement positions the mobile device to face substantially upward and when the tray is rotated to face substantially downward, the holding arrangement retains the mobile device on the tray.

16. The aircraft of claim 15,
further comprising an interchangeable frame which is disposed on the tray element.

17. The aircraft of claim 15, wherein the holding arrangement comprises at least one elongate holding element and two guide devices disposed parallel to one another and spaced apart from one another, and at least one holding element is movably mounted in the guide devices.

\* \* \* \* \*